No. 896,269. PATENTED AUG. 18, 1908.
R. J. BIRDWELL.
PORTABLE BRACKET.
APPLICATION FILED FEB. 4, 1908.
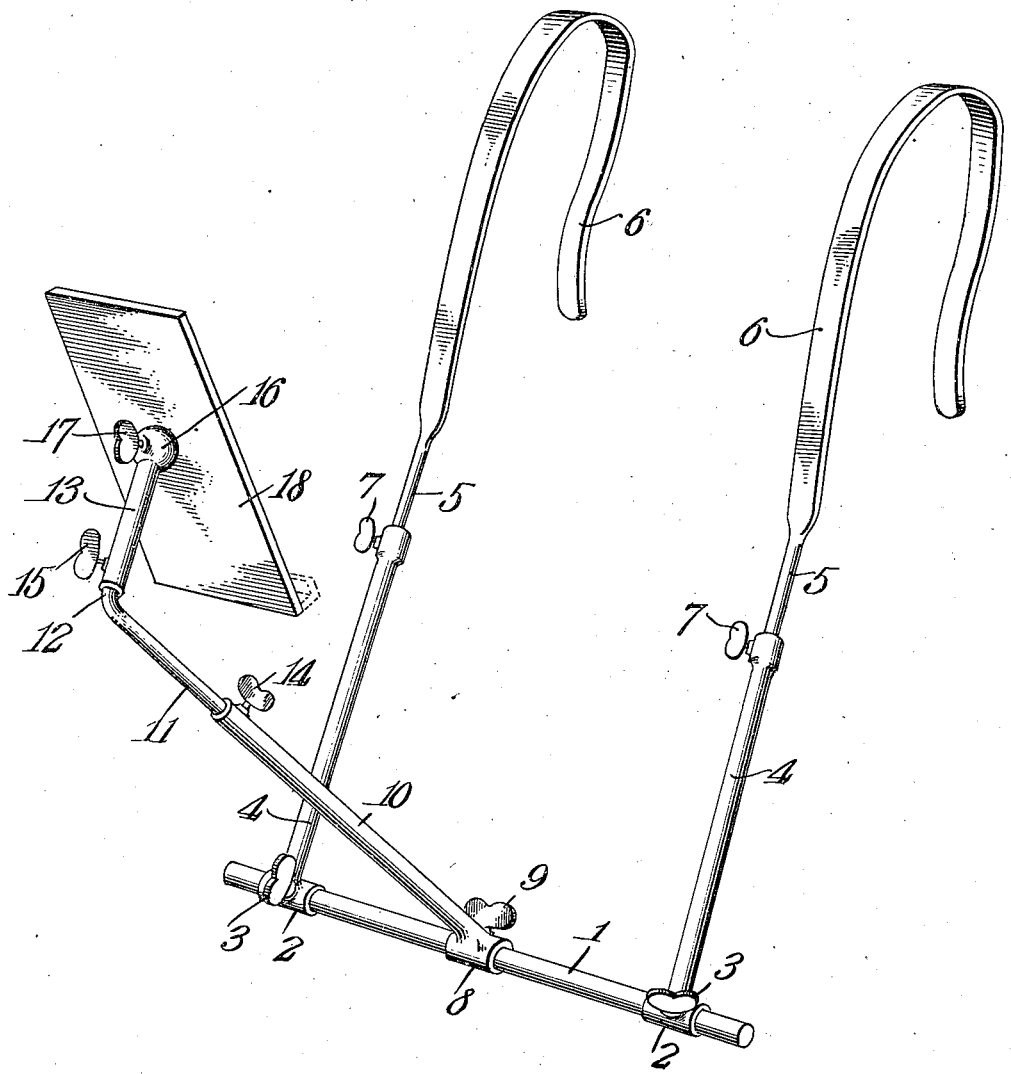
Inventor
Russell J. Birdwell.
Witnesses
By C. A. Snow & Co.
Attorneys

UNITED STATES PATENT OFFICE.

RUSSELL JONES BIRDWELL, OF WEATHERFORD, TEXAS.

PORTABLE BRACKET.

No. 896,269.

Specification of Letters Patent.

Patented Aug. 18, 1908.

Application filed February 4, 1908. Serial No. 414,270.

*To all whom it may concern:*

Be it known that I, RUSSELL JONES BIRDWELL, a citizen of the United States, residing at Weatherford, in the county of Parker and State of Texas, have invented a new and useful Portable Bracket, of which the following is a specification.

This invention relates to portable brackets of that character designed to be attached to the body of a person for supporting a mirror, a music rack or manuscript holder at a point where it can be conveniently seen.

It is particularly adapted for supporting a mirror designed to be used in lieu of the ordinary hand mirror or it can be employed by musicians for holding music in position where it can be conveniently read, or by typewriter operators for holding manuscripts.

One of the objects of the invention is to provide a bracket of this character which is capable of adjustment to fit persons of different proportions, the bracket being so constructed as to engage and be suspended from the shoulders of the user, there being adjustable means employed for supporting a mirror or rack in a desired position in front of the user.

With these and other objects in view the invention consists of certain novel features of construction and combinations of parts which will be hereinafter more fully described and pointed out in the claims.

In the accompanying drawing, which is a perspective view of the device, the preferred form of the invention has been shown.

Referring to the drawing by characters of reference, 1 designates a cross bar having sleeves 2 slidably mounted thereon and designed to be held by means of set screws 3. Tubular arms 4 extend from these sleeves and telescopically mounted within each of them is a rod 5 merging into a crooked spring band 6 of sufficient size to conveniently fit upon a person's shoulders. A set screw 7 is preferably employed for securing each rod 5 within its arm 4.

Slidably mounted on rod 1 between the sleeves 2 is another sleeve 8 designed to be secured in a predetermined position by means of a set screw 9. A tubular arm 10 extends from this sleeve and slidably mounted within it is a rod 11 having one end portion bent at an angle thereto as indicated at 12 and designed to project into a tubular member 13. A set screw 14 is preferably employed for locking rod 11 within arm 10 and another set screw 15 is preferably utilized for fastening the extension 12 and the member 13 together. Said member 13 is provided at its free end with a socket 16 having a set screw 17 and this clip constitutes one member of a ball and socket joint of the ordinary or any preferred construction, the other member of said joint being arranged upon the rear face of a mirror 18. If preferred, however, in lieu of a mirror a suitable rack may be employed as indicated by dotted lines.

In using the device herein described the sleeves 2 are loosened upon the rod 1 and said rod is placed across the chest of the user, after which spring hooks 6 are placed in engagement with the user's shoulders. By loosening the set screw 7 the arms 4 and rods 5 can be adjusted relatively to each other so that the rod 1 can be supported at a desired elevation. Sleeves 2 can also be adjusted toward or from each other so as to cause the hooks 6 to rest comfortably upon the shoulders. The set screws 3 can then be tightened after which arm 10 can be adjusted to a desired inclination and secured and the rod 11 and member 13 adjusted longitudinally until the mirror 18 or other object supported is brought to a desired position in front of the user. If a mirror is employed, the same can be held in front of the user at any desired point, thus leaving both ends free.

Obviously by substituting a rack for the mirror the device can be advantageously used by musicians, typewriter operators, and others.

Although the parts have been shown connected by means of sleeves and set screws it is to be understood that if preferred other forms of connections may be utilized, such, for instance, as pawls and ratchets and various other changes may be made in the invention without departing from the spirit or sacrificing the advantages thereof.

What is claimed is:

1. A portable bracket comprising separate resilient shoulder engaging members, a cross bar connected and adjustable laterally and vertically relatively thereto, and a member supported by and adjustable vertically laterally and longitudinally relatively to the bar.

2. A portable bracket comprising resilient shoulder engaging devices, a cross bar adjustably connected thereto, a supporting arm adjustably connected to said bar, and a member supported by and adjustable longitudinally and vertically relatively to the arm.

3. A portable bracket comprising a cross bar, yieldable shoulder engaging hooks secured to and adjustable longitudinally and laterally relatively to the bar, an arm adjustably secured to the bar, and a member supported by and adjustable longitudinally and laterally relatively to the arm.

In testimony that I claim the foregoing as my own, I have hereto affixed my signature in the presence of two witnesses.

RUSSELL JONES BIRDWELL.

Witnesses:
 D. C. BRATTON,
 A. D. STOKES.